United States Patent
Tsao et al.

(10) Patent No.: US 10,467,106 B2
(45) Date of Patent: Nov. 5, 2019

(54) DATA PROCESSING METHOD, DATA PROCESSING SYSTEM, AND NON-TRANSITORY COMPUTER PROGRAM PRODUCT FOR CONTROLLING A WORKLOAD DELAY TIME

(71) Applicant: Industrial Technology Research Institute, Hsinchu (TW)

(72) Inventors: Po-Jui Tsao, Taipei (TW); Yi-Feng Sun, Stony Brook, NY (US); Chuan-Yu Cho, Hsinchu (TW); Tzi-Cker Chiueh, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 180 days.

(21) Appl. No.: 15/660,957

(22) Filed: Jul. 27, 2017

(65) Prior Publication Data

US 2018/0341555 A1 Nov. 29, 2018

(30) Foreign Application Priority Data

May 24, 2017 (TW) .............................. 106117127 A

(51) Int. Cl.
*G06F 11/00* (2006.01)
*G06F 11/14* (2006.01)
*G06F 11/20* (2006.01)

(52) U.S. Cl.
CPC ...... *G06F 11/1461* (2013.01); *G06F 11/1466* (2013.01); *G06F 11/2038* (2013.01);
(Continued)

(58) Field of Classification Search
CPC ............. G06F 11/1464; G06F 11/1492; G06F 11/1461; G06F 11/0712; G06F 16/128
See application file for complete search history.

(56) References Cited

U.S. PATENT DOCUMENTS 8,074,035 B1 * 12/2011 Per ..................... G06F 11/1451
707/610
8,812,907 B1    8/2014 Bissett et al.
(Continued)

FOREIGN PATENT DOCUMENTS

CN    102136993    7/2011
CN    102521071    6/2012
(Continued)

OTHER PUBLICATIONS

Brendan Cully et al.,"Remus: High Availability via Asynchronous Virtual Machine Replication", Proceedings of the 5th USENIX Symposium on Networked Systems Design & Implementation, NSDI 2008, Apr. 16-18, 2008,pp. 161-174.
(Continued)

*Primary Examiner* — Christopher S McCarthy
(74) *Attorney, Agent, or Firm* — JCIPRNET

(57) ABSTRACT

A data processing method, a data processing system and a computer program product are provided. The data processing method includes executing a running operation. The data processing method also includes suspending the running operation at a preset time point in a period of the running operation and calculating a remaining processing time according to a transfer amount of a plurality of dirty pages which are collected before the preset time point in the period of the running operation. The data processing method further includes continuing to execute the running operation, suspending the running operation, and executing a snapshot operation to generate a corresponding data snapshot based on the remaining processing time, and executing a transfer operation to transfer the corresponding data snapshot.

16 Claims, 5 Drawing Sheets

(52) U.S. Cl.
CPC ...... *G06F 11/2048* (2013.01); *G06F 11/2094* (2013.01); *G06F 11/2097* (2013.01); *G06F 2201/815* (2013.01); *G06F 2201/84* (2013.01)

(56) References Cited

U.S. PATENT DOCUMENTS

| | | | |
|---|---|---|---|
| 8,983,961 | B2 | 3/2015 | Chan et al. |
| 9,015,164 | B2 | 4/2015 | Chan et al. |
| 2010/0107158 | A1 | 4/2010 | Chen et al. |
| 2012/0284714 | A1 | 11/2012 | Venkitachalam et al. |
| 2013/0290781 | A1 | 10/2013 | Chen et al. |
| 2013/0290782 | A1 | 10/2013 | Chen et al. |
| 2014/0089447 | A1* | 3/2014 | Uchida ............... H04L 67/1097 709/212 |
| 2014/0149695 | A1 | 5/2014 | Laslaysky et al. |
| 2015/0007172 | A1* | 1/2015 | Hudzia ............... G06F 9/45533 718/1 |
| 2015/0205671 | A1* | 7/2015 | Bissett ................ G06F 11/1484 714/15 |
| 2015/0370645 | A1* | 12/2015 | Dhanalakoti ....... G06F 11/1451 707/646 |
| 2016/0253197 | A1* | 9/2016 | Bonzini .............. G06F 9/45558 718/1 |
| 2017/0163728 | A1* | 6/2017 | Chawla ................ G06F 3/0619 |
| 2017/0168901 | A1* | 6/2017 | Tsao .................... G06F 11/1451 |

FOREIGN PATENT DOCUMENTS

| | | |
|---|---|---|
| CN | 104268003 | 1/2015 |
| CN | 104572248 | 4/2015 |
| CN | 103019884 | 7/2015 |
| TW | I584131 | 5/2017 |

OTHER PUBLICATIONS

Maohua Lu et al.,"Fast Memory State Synchronization for Virtualization-based Fault Tolerance", IEEE/IFIP International Conference on Dependable Systems & Networks, Jun. 29-Jul. 2, 2009, pp. 534-543.

Kai-Yuan Hou et al.,"HydraVM: Low-Cost, Transparent High Availability for Virtual Machines", HP Laboratories, Technical report, HPL-2011-24, Feb. 21, 2011, pp. 1-13.

Yoshiaki Tamura et al.,"Kemari: Virtual Machine Synchronization for Fault Tolerance", Proceedings of the USENIX 2008,pp. 1-2.

Kai Li et al.,"Low-Latency, Concurrent Checkpointing for Parallel Programs", IEEE Transactions on Parallel and Distributed Systems, vol. 5, No. 8, Aug. 1994, pp. 874-879.

Michael R. Hines et al.,"Post-Copy Based Live Virtual Machine Migration Using Adaptive Pre-Paging and Dynamic Self-Ballooning", Proceedings of the 5th International Conference on Virtual Execution Environments, VEE 2009, Mar. 11-13, 2009, pp. 51-60.

"Office Action of Taiwan Counterpart Application," dated Nov. 28, 2017, p. 1-p. 11.

\* cited by examiner

DATA PROCESSING METHOD, DATA PROCESSING SYSTEM, AND NON-TRANSITORY COMPUTER PROGRAM PRODUCT FOR CONTROLLING A WORKLOAD DELAY TIME

CROSS-REFERENCE TO RELATED APPLICATION

This application claims the priority benefit of Taiwan application serial no. 106117127, filed on May 24, 2017. The entirety of the above-mentioned patent application is hereby incorporated by reference herein and made a part of this specification.

BACKGROUND

Technical Field

The disclosure relates to a server data processing method for a virtual machine architecture with a fault tolerance mechanism, and a data processing system using this method. The disclosure also relates to a computer program product using this method.

Description of Related Art

In recent years, the Internet has developed rapidly and cloud computing has risen, which contributes to the growing demand for better information services. Therefore, virtual machines (VM) having high computing capability are widely used in various solutions. For example, integrated computers become extensively used, which combine a large number of servers, in which the virtual machines operate, through the Internet to achieve high-speed computing and large storage capacity.

In order to prevent major losses due to shutdown or data loss caused by server failure, a virtual machine fault tolerance (FT) mechanism has been developed for switching to another server instantly and uninterruptedly to continue the services when the server used to provide the services fails. FIG. 1 is a diagram illustrating a delay time caused by the virtual machine fault tolerance mechanism. Referring to FIG. 1, a backup mechanism of the server is illustrated as an example. Specifically, a data processing cycle (e.g., backup cycle) of the virtual machine with such a fault tolerance mechanism may be divided into four stages: running operation, snapshot operation, transfer operation, and output operation. When a workload request is received from a user during the operations of the first three stages, if outputs are generated for responding to the user, these outputs are temporarily stored in a buffer memory to be outputted together in the stage of the output operation. That is to say, in the virtual machine fault tolerance system, all the output information for responding to the user's request is released and transferred to the user only after the running operation, the snapshot operation, and the transfer operation are completed. Consequently, the response information corresponding to the workload requirement results in an additional delay time in the virtual machine fault tolerance system. When it comes to a delay-sensitive workload requirement (e.g., online game and real-time transaction), the system response time cannot be ensured, and disconnection or transaction failure may even occur. In view of the above, it is necessary to devise a method for controlling the delay time in the virtual machine fault tolerance system, so as to meet such a workload requirement.

SUMMARY

Embodiments of the disclosure provide a data processing method and a data processing system and a computer program product that use this method, which are capable of effectively controlling a workload delay time in a virtual machine architecture with a fault tolerance mechanism.

In an exemplary embodiment of the disclosure, a data processing method is provided, including: executing a running operation; suspending the running operation at a preset time point in a period of the running operation and calculating a remaining processing time according to a transfer amount of a plurality of dirty pages that are collected before the preset time point in the period of the running operation; continuing to execute the running operation, suspending the running operation, and executing a snapshot operation to generate a corresponding data snapshot according to the remaining processing time; and executing a transfer operation to transfer the data snapshot.

In an exemplary embodiment of the disclosure, a data processing system is provided, including: a first server and a second server. The first server is configured to run a first virtual machine. The second server is configured to run a second virtual machine and is coupled to the first server via a bus. The first virtual machine is configured to suspend the running operation at a preset time point in a period of the running operation and calculate a remaining processing time according to a transfer amount of a plurality of dirty pages that are collected before the preset time point in the period of the running operation. The first virtual machine is further configured to continue to execute the running operation, suspend the running operation, and execute a snapshot operation to generate a corresponding data snapshot according to the remaining processing time. The first virtual machine is further configured to execute a transfer operation to transfer the data snapshot.

In an exemplary embodiment of the disclosure, a computer program product having at least one code is provided. When an electronic device loads and executes the at least one code, the aforementioned data processing method is completed.

Based on the above, the data processing method, and the data processing system and the computer program product that use this method according to the exemplary embodiments of the disclosure may estimate the remaining processing time available for continuing to execute the running operation according to the transfer amount of the collected dirty pages to dynamically adjust the time of executing the running operation in the data processing cycle and determine the start time point of the operation following the running operation. Thereby, the delay time caused by the fault tolerance mechanism of the virtual machine is controlled effectively to enable the virtual machine to respond within the fixed delay time.

To make the disclosure more comprehensible, several embodiments accompanied with figures are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In order to control a delay time of a workload in a virtual machine architecture with a fault tolerance mechanism, the disclosure estimates a remaining processing time and thereby keeps the delay time within a set delay range.

Figure 1:
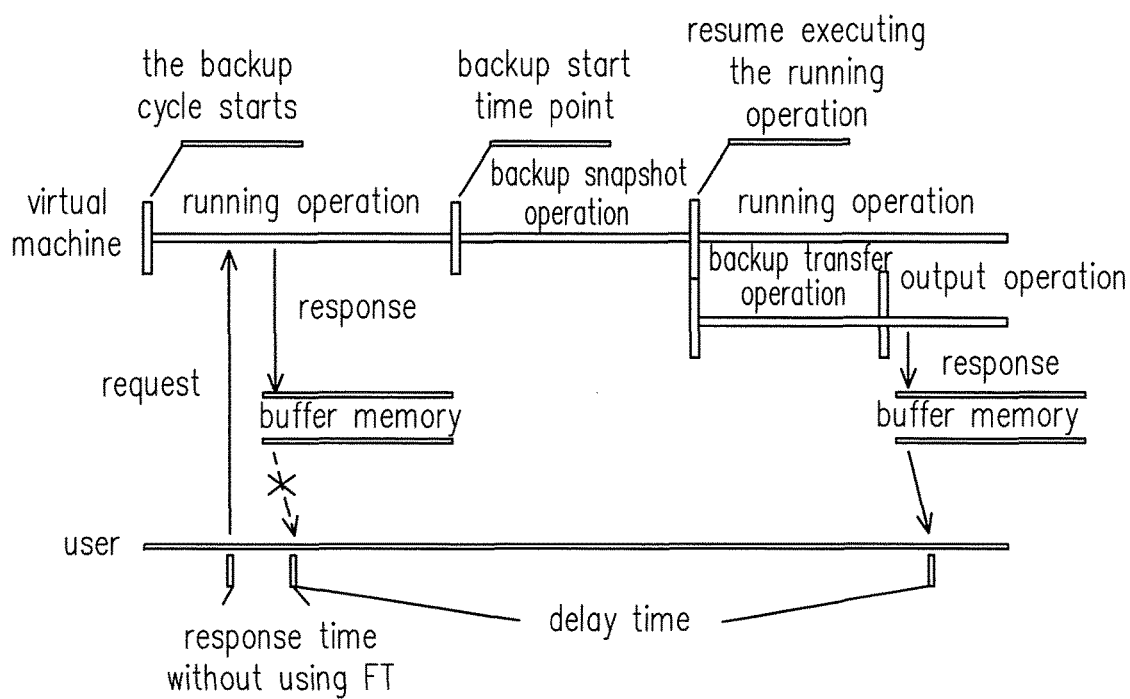
FIG. 1 is a diagram illustrating a delay time caused by the virtual machine fault tolerance mechanism.
Figure 2A:
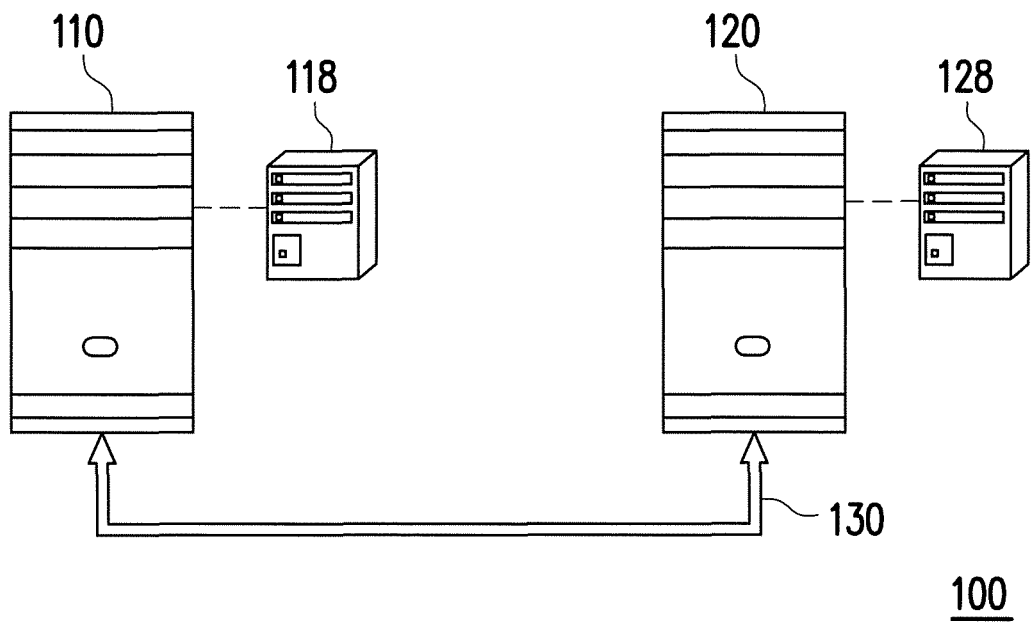
FIG. 2A is a schematic diagram illustrating a data processing system according to an exemplary embodiment.
Figure 2B:
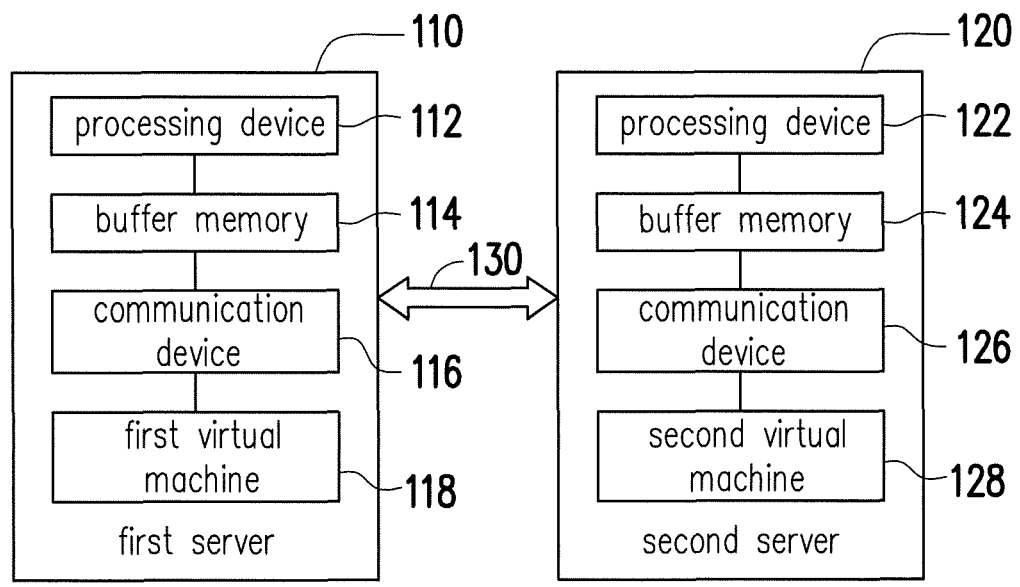
FIG. 2B is a block diagram illustrating the data processing system according to an exemplary embodiment.

FIG. 2A is a schematic diagram illustrating a data processing system according to an exemplary embodiment, and FIG. 2B is a block diagram illustrating the data processing system according to an exemplary embodiment. It should be understood that FIG. 2A and FIG. 2B are merely examples for ease of explanation and should not be construed as a limitation to the disclosure.

Referring to FIG. 2A and FIG. 2B, a data processing system 100 includes a first server 110 and a second server 120. The first server 110 includes a processing device 112, a buffer memory 114, a communication device 116, and a first virtual machine 118, and the second server 120 includes a processing device 122, a buffer memory 124, a communication device 126, and a second virtual machine 128.

The processing device 112 is coupled to the buffer memory 114 and the communication device 116 and is configured to control an overall operation of the first server 110. For example, the processing device 112 is a central processing unit (CPU).

The buffer memory 114 is configured to temporarily store a command or data executed by the processing device 112. The buffer memory 114 may be a dynamic random access memory (DRAM) or a static random access memory (SRAM), for example. Nevertheless, it should be understood that the disclosure is not limited thereto, and the buffer memory 114 may also be other suitable memories.

The communication device 116 is configured to establish a network connection with other external devices in a wired or wireless manner. For example, the first server 110 may communicate with the second server 120 via the communication device 116.

Likewise, the processing device 122, the buffer memory 124, and the communication device 126 are respectively the same as or similar to the processing device 112, the buffer memory 114, and the communication device 116 described above and thus are not repeated hereinafter.

The first server 110 and the second server 120 may respectively operate one or more virtual machines to provide different services. For example, the first virtual machine 118 runs in the first server 110 and the second virtual machine 128 runs in the second server 120. It should be understood that two servers and two virtual machines are described in this exemplary embodiment as an example, but the disclosure is not limited thereto. In other words, the data processing system 100 may include two or more servers, and each of the servers may run one or more virtual machines. For example, the data processing system 100 may further include a third server configured to run at least one virtual machine (also referred to as a "third virtual machine").

A bus 130 serves as a path for the server to transfer data. For example, the first server 110 and the second server 120 may transfer data that needs to be processed or accessed to each other via the bus 130. In this exemplary embodiment, the bus 130 is compatible with the Peripheral Component Interconnect Express (PCIe) standard. Nevertheless, it should be understood that the disclosure is not limited thereto, and the bus 130 may also be compatible with other suitable standards.

In the operation of an operating system of the server, the memory is managed by pages. When the first virtual machine 118 needs to modify the data in a certain record, the first virtual machine 118 reads the page where the data is kept from a hard disk into the buffer memory 114 and modifies the record in this page. At this time, the page in the buffer memory 114 is different from the corresponding page in the hard disk. Therefore, the page that has been updated in the buffer memory 114 is called a dirty page.

To explain how to embody the data processing method and the data processing system of the disclosure, a backup operation of the server is described hereinafter as an example. Nevertheless, the data processing method and the data processing system of the disclosure are not only applicable to the backup operation. The data processing method and the data processing system of the disclosure may also be applied to other data processing operations, such as copying or moving data.

Figure 3:
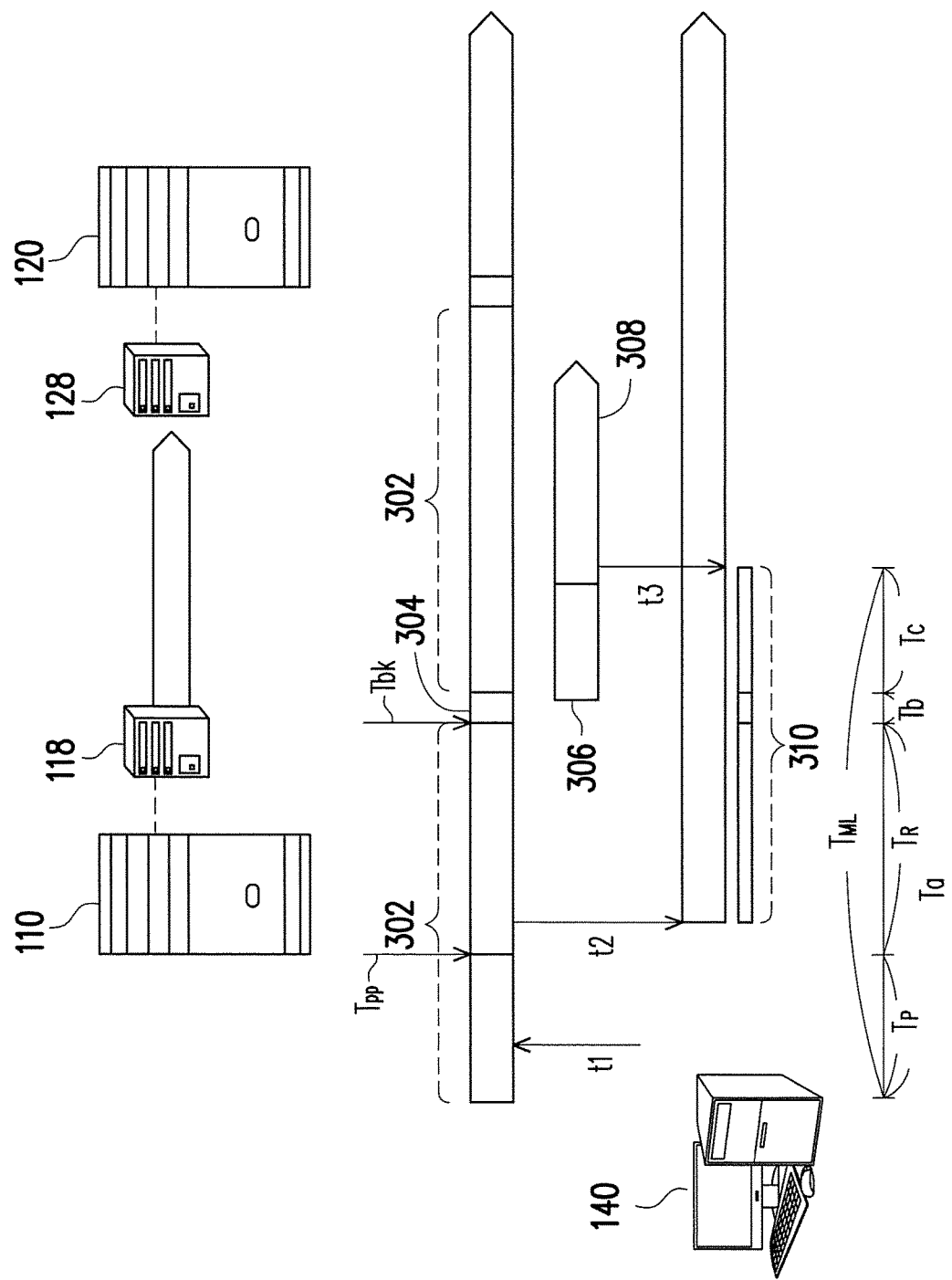
FIG. 3 is a schematic diagram illustrating the operation of a virtual machine according to an exemplary embodiment.

FIG. 3 is a schematic diagram illustrating an operation of the virtual machine according to an exemplary embodiment.

Referring to FIG. 3, a data processing cycle (e.g., a backup cycle) for the virtual machine with the fault tolerance mechanism may be divided into four stages, e.g., a running operation 302, a snapshot operation 304, a transfer operation 306, and an output operation 308. Generally, in the running operation 302, the first virtual machine 118 adds, modifies, or accesses the data in the hard disk according to a request command from a user. For example, in the running operation 302, the first virtual machine 118 temporarily stores the aforementioned dirty page and response information for responding to the user in the buffer memory 114. By executing the snapshot operation 304, the dirty page obtained in the running operation 302 may be backed up to generate a data snapshot, and after completing the snapshot operation 304, the first virtual machine 118 resumes execution of the running operation 302. For example, a snapshot time of the snapshot operation 304 is about 1 to 2 ms. The snapshot time of the snapshot operation 304 is relatively short in the data processing cycle, and thus may be regarded as a fixed value in this exemplary embodiment. The first virtual machine 118 transfers the data snapshot to the second virtual machine 128 in the transfer operation 306 to complete backup of the data. When the second server 120 serves as a backup server of the first server 110, in an example where the data processing system 100 includes a plurality of the first servers 110, the second virtual machine 128 may simultaneously serve a plurality of the first virtual machines 118 of the first servers 110. That is, the second server 120 may simultaneously serve as the backup server of a plurality of the first servers 110. After completing transfer of the data snapshot, the data snapshot corresponding to the dirty page has been backed up to the second virtual machine 128. Thus, if the first server 110 is damaged and unable to provide services, the second virtual machine 128 of the second server 120 may instantly take over the work performed by the first virtual machine 118 of the first server 110 and provide the corresponding services. In the example where the data processing system 100 further includes the third server, the second virtual machine 128 also executes the snapshot operation 304 and the transfer operation 306 to transfer the data snapshot to the virtual machine (e.g., the third virtual machine) that runs in the third server, so as to achieve more reliable backup. Moreover, the output operation 308 is to output the response information for responding to the user. For example, the first virtual machine 118 or the second virtual machine 128 executes the output operation 308 to transfer the response information to an electronic device. Since the transfer operation 306 is mainly for transferring the dirty page, a time of the transfer operation 306 changes based on a transfer amount of the dirty pages collected. Accordingly, the data processing system 100 of the disclosure controls the delay time with reference to the transfer amount of the dirty pages collected and the processing time of the transfer operation 306.

The first virtual machine 118 calculates a remaining processing time according to the transfer amount of the dirty pages that are collected before a preset time point, and executes the running operation 302 according to the remaining processing time. If there is no remaining processing time after the calculation, the first virtual machine 118 directly executes the snapshot operation 304 and the transfer operation 306 to transfer the corresponding data snapshot to the second virtual machine 128. In order to more clearly illustrate the operations of the data processing system 100 and the virtual machines thereof according to the disclosure, an example is described hereinafter also with reference to FIG. 3.

Figure 4A:
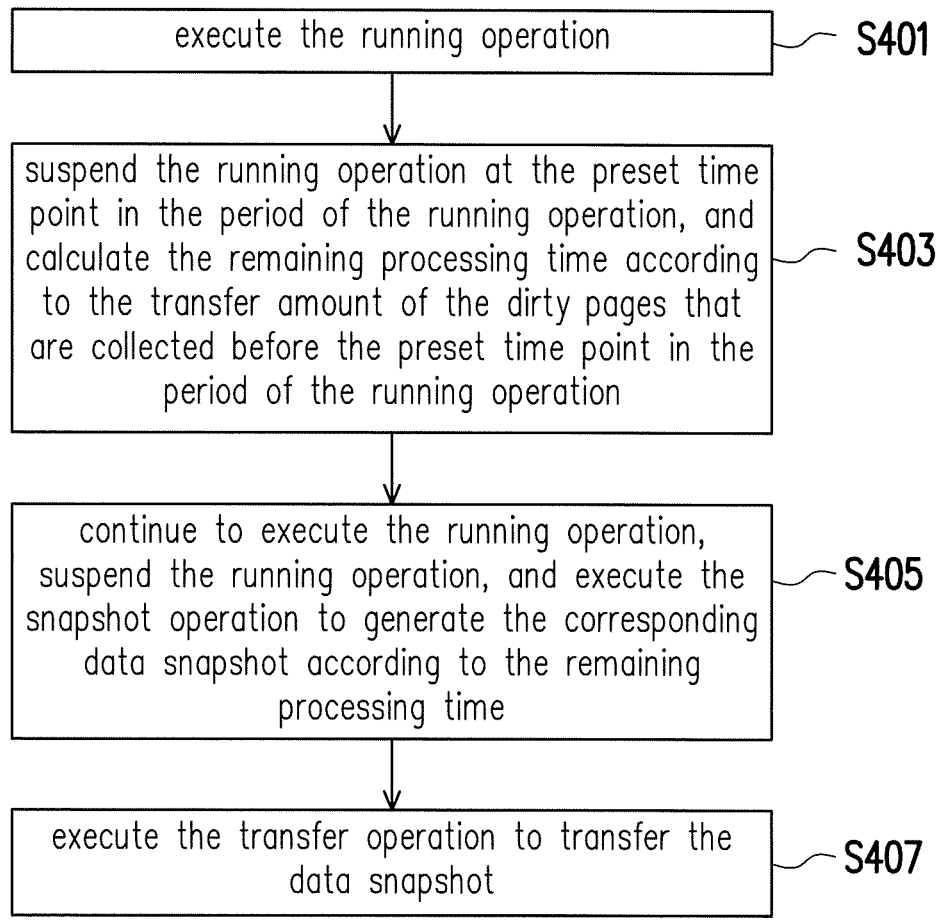
FIG. 4A is a flowchart illustrating a data processing method according to an exemplary embodiment.

FIG. 4A is a flowchart illustrating a data processing method according to an exemplary embodiment.

With reference to FIG. 3 and FIG. 4A, in Step S401, the first virtual machine 118 executes the running operation 302. In a period of the running operation 302, the first virtual machine 118 collects a plurality of dirty pages. In Step S403, the first virtual machine 118 suspends the running operation 302 at a preset time point $T_{pp}$ in the period of the running operation 302, and calculates a remaining processing time $T_R$ according to the transfer amount of the dirty pages that are collected before the preset time point $T_{pp}$ in the period of the running operation. By the preset time point $T_{pp}$, the running operation 302 of the first virtual machine 118 has been executed for a preset time $T_P$. Therefore, the first virtual machine 118 calculates the remaining processing time $T_R$ according to the transfer amount of the dirty pages that are collected in the preset time $T_P$. Then, in Step S405, the first virtual machine 118 continues to execute the running operation 302, suspends the running operation 302, and executes the snapshot operation 304 to generate the corresponding data snapshot according to the remaining processing time $T_R$. In other words, the first virtual machine 118 continues to collect a plurality of dirty pages in the remaining processing time $T_R$. Here, the remaining processing time $T_R$ represents a time between the preset time point $T_{pp}$ and a start time point $T_{bk}$. In other words, the first virtual machine 118 may determine the start time point $T_{bk}$ according to the calculated remaining processing time $T_R$. The start time point $T_{bk}$ refers to a time point of starting to execute another operation following the running operation in one data processing cycle. In this exemplary embodiment, the start time point $T_{bk}$ may be the time point of starting to execute the snapshot operation 304. Therefore, after the first virtual machine 118 continues to execute the running operation 302 according to the remaining processing time $T_R$, the first virtual machine 118 suspends the running operation 302 at the start time point $T_{bk}$ and then executes the snapshot operation 304. Thereafter, in Step S407, the first virtual machine 118 executes the transfer operation 306 to transfer the data snapshot to the second virtual machine 128 and thereby completes one data processing cycle.

If the user sends a request command to the first virtual machine 118 via an electronic device 140 at a time $t_1$ during the data processing cycle, the first virtual machine 118 executes a processing operation according to the request command to obtain the response information corresponding to the request command. In a data processing system of a virtual machine that does not use the fault tolerance mechanism, after the first virtual machine 118 receives the request command from the electronic device 140 at the time $t_1$ and executes the processing operation according to the request command to obtain the response information corresponding to the request command, the first virtual machine 118 may immediately transfer the response information to the electronic device 140 at a time $t_2$. In contrast thereto, in the data processing system of the virtual machine that uses the fault tolerance mechanism, in order to ensure that all the dirty pages are successfully copied or backed up to the second virtual machine 128, the first virtual machine 118 first temporarily stores the response information in the buffer memory 114 and waits for completion of the snapshot operation 304 and the transfer operation 306 to execute the output operation 308 to transfer the response information to the electronic device 140 at a time $t_3$. Here, since a response time between the time $t_1$ and the time $t_2$ is a fixed value, in this exemplary embodiment, a period between the time $t_2$ and the time $t_3$ is defined as a delay time 310. Nevertheless, the disclosure is not limited thereto. In another exemplary embodiment, for example, the delay time 310 may also be a period between the time $t_1$ and the time $t_3$.

According to the disclosure, the delay time 310 described above is controlled within a specific range, so as to ensure that the response time of the data processing system 100 meets a workload requirement that is delay sensitive. In this exemplary embodiment of the disclosure, the first virtual machine 118 sets an expected delay $T_{ML}$. Further, the first virtual machine 118 calculates an estimated update rate according to the transfer amount of the dirty pages collected in the preset time $T_P$ and the preset time $T_P$, and obtains a parameter according to the estimated update rate. Then, the first virtual machine 118 calculates the remaining processing time $T_R$ according to the expected delay $T_{ML}$, the preset time $T_P$, a snapshot time $T_b$ for generating the corresponding data snapshot, and the aforementioned parameter.

The first virtual machine 118 calculates a transfer rate according to a transfer amount of a plurality of previous dirty pages (also referred to as a "previous transfer amount") and a time for transferring these dirty pages (also referred to as a "previous transfer time"). A sum of the preset time $T_P$ and the remaining processing time $T_R$ may represent a running time $T_a$ of the running operation 302 before the start time point $T_{bk}$. Therefore, the first virtual machine 118 may obtain an estimated transfer time $T_c$ according to the estimated update rate, the running time $T_a$, and the transfer rate. For example, the first virtual machine 118 may multiply the estimated update rate by the running time $T_a$ to obtain an estimated transfer amount corresponding to the dirty pages collected in the running time $T_a$, and divide the estimated transfer amount by the transfer rate to obtain the estimated transfer time $T_c$. The obtained remaining processing time $T_R$ may make the sum of the running time $T_a$, the snapshot time $T_b$, and the estimated transfer time $T_c$ not greater than (i.e., less than or equal to) the set expected delay $T_{ML}$. Thereby, the delay time 310 is controlled within the specific range.

As described above, the first virtual machine 118 obtains a parameter according to the estimated update rate. The first virtual machine 118 obtains the aforementioned parameter according to the estimated update rate and the transfer rate. For example, according to a correlation between the preset time $T_P$, the remaining processing time $T_R$, and the estimated transfer time $T_c$, the first virtual machine 118 may calculate a ratio of the estimated update rate to the transfer rate, and adds 1 to the ratio to serve as the aforementioned parameter. Here, $R_P$ represents the estimated update rate and $R_{AVG}$ represents the transfer rate. Therefore, the remaining processing time $T_R$ may be obtained by the following equation (1).

$$T_R=(T_{ML}-T_b)/(1+R_P/R_{AVG})-T_P \qquad (1)$$

In other words, when the estimated update rate $R_P$ is less than the transfer rate $R_{AVG}$, the remaining processing time $T_R$ is relatively large; and when the estimated update rate $R_P$ is greater than the transfer rate, the remaining processing time $T_R$ is relatively small. In the case where the estimated update rate $R_P$ is the maximum update rate, there is no remaining processing time $T_R$ left. The maximum update rate may be the maximum rate for the electronic device 140 to write data. In other words, the update rate of the dirty pages generated by various workloads does not exceed the maximum update rate. When the estimated update rate $R_P$ is the maximum update rate, the transfer amount of the dirty pages that the first virtual machine 118 collects in the preset time $T_P$ is close to or equal to a maximum transfer amount that the first virtual machine 118 is able to collect in the period of the running operation 302 before the start time point $T_{bk}$.

Figure 4B:
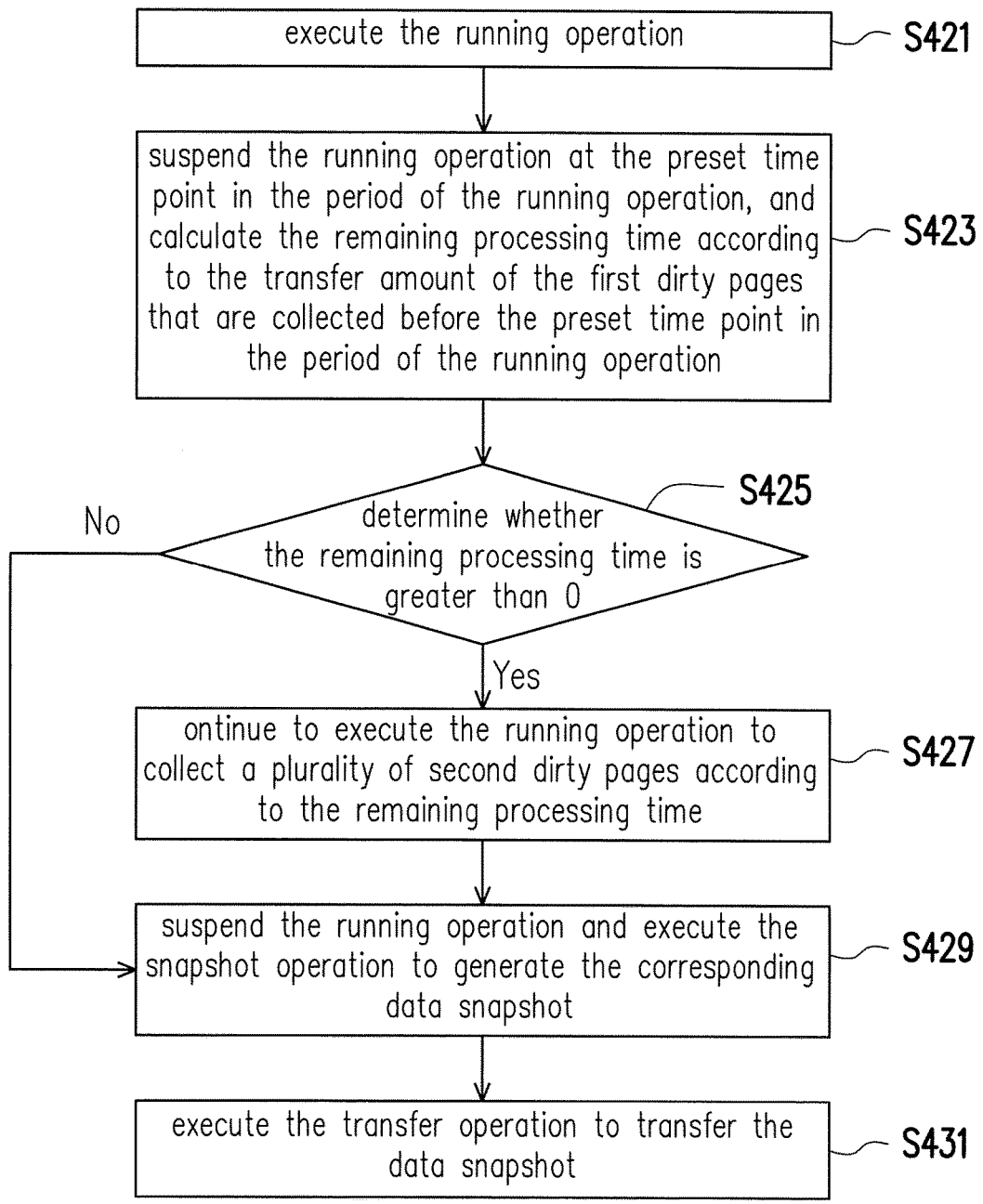
FIG. 4B is a flowchart illustrating the data processing method according to another exemplary embodiment.

Based on the above, after obtaining the remaining processing time $T_R$, the first virtual machine 118 may continue to execute the running operation 302 or not continue to execute the running operation 302 but execute the snapshot operation 304 instead according to the remaining processing time $T_R$. FIG. 4B is described hereinafter as an example.

FIG. 4B is a flowchart illustrating the data processing method according to another exemplary embodiment.

With reference to FIG. 3 and FIG. 4B, in Step S421, the first virtual machine 118 executes the running operation 302. In Step S423, the first virtual machine 118 suspends the running operation 302 at the preset time point $T_{pp}$ in the period of the running operation 302, and calculates the remaining processing time $T_R$ according to the transfer amount of a plurality of first dirty pages that are collected before the preset time point $T_{pp}$ in the period of the running operation. The operations of Steps S421 to S423 of FIG. 4B are the same as the operations of Steps S401 to S403 of FIG. 4A and thus are not repeated hereinafter.

In this exemplary embodiment, after obtaining the remaining processing time $T_R$, the first virtual machine 118 determines whether to continue to execute the running operation 302 according to the remaining processing time $T_R$. For example, in Step S425, the first virtual machine 118 determines whether the remaining processing time $T_R$ is greater than 0.

If the remaining processing time $T_R$ is greater than 0, the first virtual machine 118 determines that there is remaining processing time $T_R$ left for continuing to execute the running operation 302, and thus executes Step S427. In Step S427, the first virtual machine 118 continues to execute the running operation 302 to collect a plurality of second dirty pages according to the remaining processing time $T_R$. When the first virtual machine 118 continues to execute the running operation 302 and the remaining processing time $T_R$ has passed, the first virtual machine 118 determines that the operation of continuing to execute the running operation 302 to collect a plurality of second dirty pages according to the remaining processing time $T_R$ (i.e., Step S427) has been completed. After completing the operation of continuing to execute the running operation 302 according to the remaining processing time $T_R$, in Step S429, the first virtual machine 118 suspends the running operation 302 and executes the snapshot operation 304 to generate the corresponding data snapshot. In this case, the data snapshot is generated based on the first dirty pages and the second dirty pages. In an exemplary embodiment, the time point of completing the operation of continuing to execute the running operation 302 according to the remaining processing time $T_R$ is equivalent to the start time point $T_{bk}$. Therefore, the first virtual machine 118 executes Step S429 at the start time point $T_{bk}$. Thereafter, in Step S431, the first virtual machine 118 executes the transfer operation 306 to transfer the data snapshot to the second virtual machine 128 and thereby completes one data processing cycle.

However, if the remaining processing time $T_R$ is not greater than 0, the first virtual machine 118 does not continue to execute the running operation 302, but directly executes Step S429. In other words, after determining that there is no remaining processing time $T_R$ left, the first virtual machine 118 directly executes Step S429 to suspend the running operation 302 and execute the snapshot operation 304 to generate the corresponding data snapshot. In an exemplary embodiment, the preset time point $T_{pp}$ is equivalent to the start time point $T_{bk}$. Because the first virtual machine 118 does not continue to execute the running operation 302, the first virtual machine 118 does not collect dirty pages other than the first dirty pages before the start time point $T_{bk}$. In this case, the data snapshot is generated only based on the first dirty pages. Thereafter, in Step S431, the first virtual machine 118 executes the transfer operation 306 to transfer the data snapshot to the second virtual machine 128 and thereby completes one data processing cycle.

In an exemplary embodiment, the first virtual machine 118 may divide the collected dirty pages into a plurality of data units, and obtain the transfer amount of the dirty pages according to data units that are actually updated among all the data units. The number of the data units that are actually updated is not greater than the number of the data units divided from the collected dirty pages. When executing the snapshot operation 304, the first virtual machine 118 generates the corresponding data snapshot according to the data units that are actually updated. Take the first dirty pages described above as an example, the first virtual machine 118 may divide each first dirty page into 128 first data units, and determine one or more second data units that are actually updated among the first data units. A total data amount of the second data units that are actually updated among all the first dirty pages is the transfer amount of all the first dirty pages. The first virtual machine 118 may obtain the transfer amount of all the second dirty pages in the same manner as described above.

In addition, the first virtual machine 118 may also estimate the transfer amount afterward according to the transfer amounts corresponding to a plurality of check time points by dividing each dirty page into a plurality of data units as described above. Here, the transfer amount corresponding to one certain check time point refers to the transfer amount of the dirty pages that are collected before this check time point in the period of the running operation. For ease of explanation, the data amount of one data unit is referred to as 1 data unit, and 1 data unit may be a plurality of bits.

In an exemplary embodiment, the estimated transfer amount may be obtained by dividing the transfer amount at one certain check time point by the elapsed time corresponding to this check time point to obtain a value, and multiplying the obtained value by an estimated time. For example, it is assumed that the estimated time is 5 ms and the check is performed per 1 ms. The transfer amount obtained at the first check time point (that is, 1 ms has elapsed) is 2 data units. Therefore, the transfer amount obtained at the time of 5 ms is estimated to be 10 data units. The transfer amount obtained at the second check time point (that is, 2 ms has elapsed) is 5 data units. Therefore, the transfer amount obtained at the time of 5 ms is estimated to be 12.5 data units (i.e., 5/2*5=12.5).

In another exemplary embodiment, the estimated transfer amount may also be obtained by multiplying a transfer amount difference between the transfer amount of one certain check time point and the transfer amount of the previous check time point by an estimated time. For example, it is assumed that the estimated time is 5 ms and the check is performed per 1 ms. The transfer amount obtained at the first check time point (that is, 1 ms has elapsed) is 2 data units, and the transfer amount difference between the start and the first check time point is 2 data units. Therefore, the transfer amount obtained at the time of 5 ms is estimated to be 10 data units (i.e., 2*5=10). The transfer amount obtained at the second check time point (that is, 2 ms has elapsed) is 5 data units, and the transfer amount difference between the second check time point and the first check time point is 3 data units. Therefore, the transfer amount obtained at the time of 5 ms is estimated to be 15 data units (i.e., 3*5=15).

Based on the above-mentioned method for obtaining the estimated transfer amount, optimal values of the expected delay $T_{ML}$ and the preset time point $T_{pp}$ may be determined through experiment. In an exemplary embodiment, the expected delay $T_{ML}$ may be set to 10 ms. Moreover, it is assumed that one expected delay $T_{ML}$ is 1 time unit, and the preset time $T_P$ corresponding to the preset time point $T_{pp}$ may be set to 0.4 time unit. For example, if the expected delay $T_{ML}$ is 10 ms, the preset time $T_P$ corresponding to the preset time point $T_{pp}$ may be set to 4 ms. In other words, the time point when the running operation 302 has been executed for 4 ms is the preset time point $T_{pp}$.

For example, in the example where the expected delay $T_{ML}$ is 10 ms, the preset time $T_P$ is 4 ms. It is assumed that the transfer amount of the dirty pages that the first virtual machine 118 collects in the preset time $T_P$ is equivalent to the size of 100 dirty pages. For example, the size of one dirty page is 4 KB (Bytes), and accordingly the size of 100 dirty pages is 400 KB. Then, based on the transfer amount of the dirty pages collected in the preset time $T_P$, the first virtual machine 118 calculates the estimated update rate as 100 KB/ms. It is assumed that the transfer rate is 200 KB/ms (equivalent to 50 dirty pages/ms). Therefore, the first virtual machine 118 may determine that the remaining processing time is 2 ms through calculation according to the equation (1) described above. Accordingly, the first virtual machine 118 continues executing the running operation 302 for 2 ms and suspends the running operation 302 and executes the snapshot operation 304.

According to another exemplary embodiment of the disclosure, a computer program product is provided for executing the data processing method described above. The computer program product includes at least one code, and may achieve the function of the data processing method and the data processing system 100 after the processing device of the electronic device (e.g., the first server 110 or the second server 120) loads and executes the at least one code.

In conclusion, the data processing method, the processing system thereof, and the computer program product according to the exemplary embodiments of the disclosure may estimate the remaining processing time available for continuing to execute the running operation according to the transfer amount of the collected dirty pages to dynamically adjust the time of executing the running operation and determine the start time point. Thereby, the delay time is controlled within the specific expected delay time, so as to effectively prevent service interruption caused by the delay-sensitive workload requirement due to long delay time, and improve user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A data processing method, comprising:
setting an expected delay;
executing a running operation;
suspending the running operation at a preset time point in a period of the running operation and calculating a remaining processing time according to a transfer amount of a plurality of dirty pages that are collected before the preset time point in the period of the running operation;
continuing to execute the running operation, suspending the running operation, and executing a snapshot operation to generate a corresponding data snapshot according to the remaining processing time; and
executing a transfer operation to transfer the data snapshot,
wherein the step of calculating the remaining processing time according to the transfer amount of the dirty pages that are collected before the preset time point in the period of the running operation comprises:
calculating an estimated update rate according to the transfer amount of the dirty pages and a preset time corresponding to the preset time point;
obtaining a parameter according to the estimated update rate; and
calculating the remaining processing time according to the expected delay, the preset time corresponding to the preset time point, a snapshot time for generating the corresponding data snapshot, and the parameter,
wherein a sum of the preset time corresponding to the preset time point and the remaining processing time is equal to a running time of the running operation, and a sum of the running time, the snapshot time, and an estimated transfer time for transferring the data snapshot is not greater than the expected delay.
2. The data processing method according to claim 1, further comprising:
calculating a transfer rate according to a previous transfer amount of a plurality of previous dirty pages and a previous transfer time for transferring the previous dirty pages, wherein the step of obtaining the parameter according to the estimated update rate comprises:
  obtaining the parameter according to the estimated update rate and the transfer rate.

3. The data processing method according to claim 1, wherein the dirty pages that are collected before the preset time point in the period of the running operation comprise a plurality of first dirty pages,
  wherein the step of continuing to execute the running operation, suspending the running operation, and executing the snapshot operation to generate the corresponding data snapshot according to the remaining processing time comprises:
    if the remaining processing time is greater than 0, continuing to execute the running operation to collect a plurality of second dirty pages according to the remaining processing time, and after completing continuing to execute the running operation according to the remaining processing time, suspending the running operation and executing the snapshot operation to generate the corresponding data snapshot,
  wherein the data snapshot is generated based on the first dirty pages and the second dirty pages.

4. The data processing method according to claim 3, wherein the step of continuing to execute the running operation, suspending the running operation, and executing the snapshot operation to generate the corresponding data snapshot according to the remaining processing time further comprises:
  if the remaining processing time is not greater than 0, suspending the running operation and executing the snapshot operation to generate the corresponding data snapshot, wherein the data snapshot is generated based on the first dirty pages.

5. The data processing method according to claim 1, further comprising:
  dividing the dirty pages into a plurality of first data units; and
  obtaining a plurality of second data units according to the first data units, and obtaining the transfer amount of the dirty pages according to the second data units,
  wherein the number of the second data units is not greater than the number of the first data units.

6. The data processing method according to claim 1, further comprising:
  receiving a request command from an electronic device and executing a processing operation according to the request command to obtain response information corresponding to the request command; and
  after executing the snapshot operation and the transfer operation, executing an output operation to transfer the response information to the electronic device.

7. The data processing method according to claim 1, further comprising:
  resuming executing the running operation after completing the snapshot operation.

8. A data processing system, comprising:
  a first server configured to run a first virtual machine, wherein the first virtual machine is configured to execute a running operation; and
  a second server configured to run a second virtual machine and coupled to the first server via a bus,
  wherein the first virtual machine is configured to suspend the running operation at a preset time point in a period of the running operation and calculate a remaining processing time according to a transfer amount of a plurality of dirty pages that are collected before the preset time point in the period of the running operation,
  wherein the first virtual machine is further configured to continue to execute the running operation, suspend the running operation, and execute a snapshot operation to generate a corresponding data snapshot according to the remaining processing time, and
  wherein the first virtual machine is further configured to execute a transfer operation to transfer the data snapshot,
  wherein the first virtual machine is further configured to set an expected delay,
  wherein the first virtual machine is further configured to calculate an estimated update rate according to the transfer amount of the dirty pages and a preset time corresponding to the preset time point, obtain a parameter according to the estimated update rate, and calculate the remaining processing time according to the expected delay, the preset time corresponding to the preset time point, a snapshot time for generating the corresponding data snapshot, and the parameter, and
  wherein a sum of the preset time corresponding to the preset time point and the remaining processing time is equal to a running time of the running operation, and a sum of the running time, the snapshot time, and an estimated transfer time for transferring the data snapshot is not greater than the expected delay.

9. The data processing system according to claim 8, wherein the first virtual machine is further configured to calculate a transfer rate according to a previous transfer amount of a plurality of previous dirty pages and a previous transfer time for transferring the previous dirty pages, and obtain the parameter according to the estimated update rate and the transfer rate.

10. The data processing system according to claim 8, wherein the dirty pages that are collected before the preset time point in the period of the running operation comprise a plurality of first dirty pages,
  wherein if the remaining processing time is greater than 0, the first virtual machine is configured to continue to execute the running operation to collect a plurality of second dirty pages according to the remaining processing time, and after completing continuing to execute the running operation according to the remaining processing time, suspend the running operation and execute the snapshot operation to generate the corresponding data snapshot, and
  wherein the data snapshot is generated based on the first dirty pages and the second dirty pages.

11. The data processing system according to claim 10, wherein if the remaining processing time is not greater than 0, the first virtual machine is configured to suspend the running operation and execute the snapshot operation to generate the corresponding data snapshot, and wherein the data snapshot is generated based on the first dirty pages.

12. The data processing system according to claim 8, wherein the first virtual machine is further configured to divide the dirty pages into a plurality of first data units, obtain a plurality of second data units according to the first data units, and obtain the transfer amount of the dirty pages according to the second data units, and
  wherein the number of the second data units is not greater than the number of the first data units.

13. The data processing system according to claim 8, wherein the first virtual machine is further configured to receive a request command from an electronic device and execute a processing operation according to the request command to obtain response information corresponding to the request command, and
    wherein the first virtual machine is further configured to execute an output operation to transfer the response information to the electronic device after executing the snapshot operation and the transfer operation.

14. The data processing system according to claim 8, wherein the first virtual machine is further configured to resume executing the running operation after completing the snapshot operation.

15. The data processing system according to claim 8, wherein the bus complies with a Peripheral Component Interconnect Express (PCIe) standard.

16. A non-transitory computer program product comprising at least one code, when executed by an electronic device, configured to cause the electronic device to perform the method of claim 1.

\* \* \* \* \*